United States Patent
Abraham et al.

(10) Patent No.: US 9,655,072 B2
(45) Date of Patent: May 16, 2017

(54) SYSTEMS, APPARATUS AND METHODS FOR SYNCHRONIZING A GLOBAL TIME REFERENCE FOR ACCESS POINTS OVER THE AIR

(71) Applicant: QUALCOMM Incorporated, San Diego, CA (US)

(72) Inventors: Santosh Paul Abraham, San Diego, CA (US); Gwendolyn Denise Barriac, Encinitas, CA (US); Simone Merlin, Solana Beach, CA (US); George Cherian, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 221 days.

(21) Appl. No.: 14/533,894

(22) Filed: Nov. 5, 2014

(65) Prior Publication Data

US 2015/0131528 A1 May 14, 2015

Related U.S. Application Data

(60) Provisional application No. 61/902,047, filed on Nov. 8, 2013.

(51) Int. Cl.
*H04W 56/00* (2009.01)
*H04W 88/12* (2009.01)
*H04W 88/08* (2009.01)

(52) U.S. Cl.
CPC ...... *H04W 56/0015* (2013.01); *H04W 56/001* (2013.01); *H04W 88/08* (2013.01); *H04W 88/12* (2013.01)

(58) Field of Classification Search
None
See application file for complete search history.

(56) References Cited

U.S. PATENT DOCUMENTS 8,023,495 B1    9/2011  van Erven
9,516,595 B2 *  12/2016 Abraham .......... H04W 52/0225
(Continued)

FOREIGN PATENT DOCUMENTS

WO    WO-2012026935 A1    3/2012
WO    WO-2013048499 A1    4/2013

OTHER PUBLICATIONS

International Search Report and Written Opinion—PCT/US2014/064357—ISA/EPO—Jan. 23, 2015.

*Primary Examiner* — Marsha D. Banks Harold
*Assistant Examiner* — Christopher Wyllie
(74) *Attorney, Agent, or Firm* — Knobbe, Martens, Olson & Bear, LLP (57) ABSTRACT

Methods and apparatus for synchronizing a global time reference for access points over the air are provided. In one aspect, a method for synchronizing a global time of an access point comprises receiving a message comprising a global time indication from a second access point. The method further includes updating the global time of the access point to the global time indication from the second access point by updating a timer of the access point by an increment not to exceed a predetermined value selected small enough to ensure a maintenance of synchronization between the access point and at least one associated wireless station. The global time of the access point is updated to the global time indication from the second access point when the global time indication from the second access point indicated a later global time than the global time of the access point.

22 Claims, 5 Drawing Sheets

(56) References Cited

U.S. PATENT DOCUMENTS

| | | |
|---|---|---|
| 2004/0202119 A1 | 10/2004 | Edge |
| 2006/0034250 A1* | 2/2006 | Kim .................... H04B 7/2696 |
| | | 370/350 |
| 2009/0122782 A1* | 5/2009 | Horn .................. H04W 56/001 |
| | | 370/350 |
| 2013/0156016 A1 | 6/2013 | Debnath et al. |
| 2015/0245305 A1* | 8/2015 | Camps Mur .......... H04W 56/00 |
| | | 370/350 |
| 2015/0381676 A1* | 12/2015 | Seok ....................... H04W 4/06 |
| | | 370/315 |

* cited by examiner

SYSTEMS, APPARATUS AND METHODS FOR SYNCHRONIZING A GLOBAL TIME REFERENCE FOR ACCESS POINTS OVER THE AIR

CLAIM OF PRIORITY UNDER 35 U.S.C. §119

The present Application for patent claims priority to Provisional Application No. 61/902,047 entitled "SYSTEMS, APPARATUS AND METHODS FOR SYNCHRONIZING A GLOBAL TIME REFERENCE FOR ACCESS POINTS OVER THE AIR" filed Nov. 8, 2013, and assigned to the assignee hereof. Provisional Application No. 61/902,047 is hereby expressly incorporated by reference herein.

BACKGROUND

Field

Certain aspects of the present disclosure generally relate to wireless communications, and more particularly, to systems, apparatus and methods for synchronizing a global time reference for access points over the air.

Background

Access points may communicate with one or more wireless devices within an associated basic service set. Such communications are timed according to a timing synchronization function (TSF) in the access point. However, access points do not currently track a global time reference between access points of the same or different BSSs, which may lead to increased interference, decreased efficiency and throughput in wireless networks. As such, systems, apparatus and methods are needed for synchronizing a global time reference for access points over the air.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for synchronizing a global time of an access point. The method comprises receiving a message comprising a global time indication from a second access point. The method further comprises updating the global time of the access point to the global time indication from the second access point by updating a timer of the access point by an increment not to exceed a predetermined value selected small enough to ensure a maintenance of synchronization between the access point and at least one associated wireless station.

Another aspect of the disclosure provides an apparatus for synchronizing a global time of the apparatus. The apparatus comprises a receiver configured to receive a message comprising a global time indication from a second access point. The apparatus further comprises a processor configured to update the global time of the apparatus to the global time indication from the second access point by updating a timer of the apparatus by an increment not to exceed a predetermined value selected small enough to ensure a maintenance of synchronization between the apparatus and at least one associated wireless station.

Another aspect of the disclosure provides a non-transitory computer-readable medium comprising code. The code, when executed, causes the apparatus to receive a message comprising a global time indication from a second access point. The code further causes the apparatus to update the global time of the apparatus to the global time indication from the second access point by updating a timer of the apparatus by an increment not to exceed a predetermined value selected small enough to ensure a maintenance of synchronization between the apparatus and at least one associated wireless station.

Another aspect of the disclosure provides an apparatus for synchronizing a global time of the apparatus. The apparatus comprises means for receiving a message comprising a global time indication from a second access point. The apparatus further comprises means for updating the global time of the apparatus to the global time indication from the second access point by updating a timer of the apparatus by an increment not to exceed a predetermined value selected small enough to ensure a maintenance of synchronization between the apparatus and at least one associated wireless station.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Figure 1:
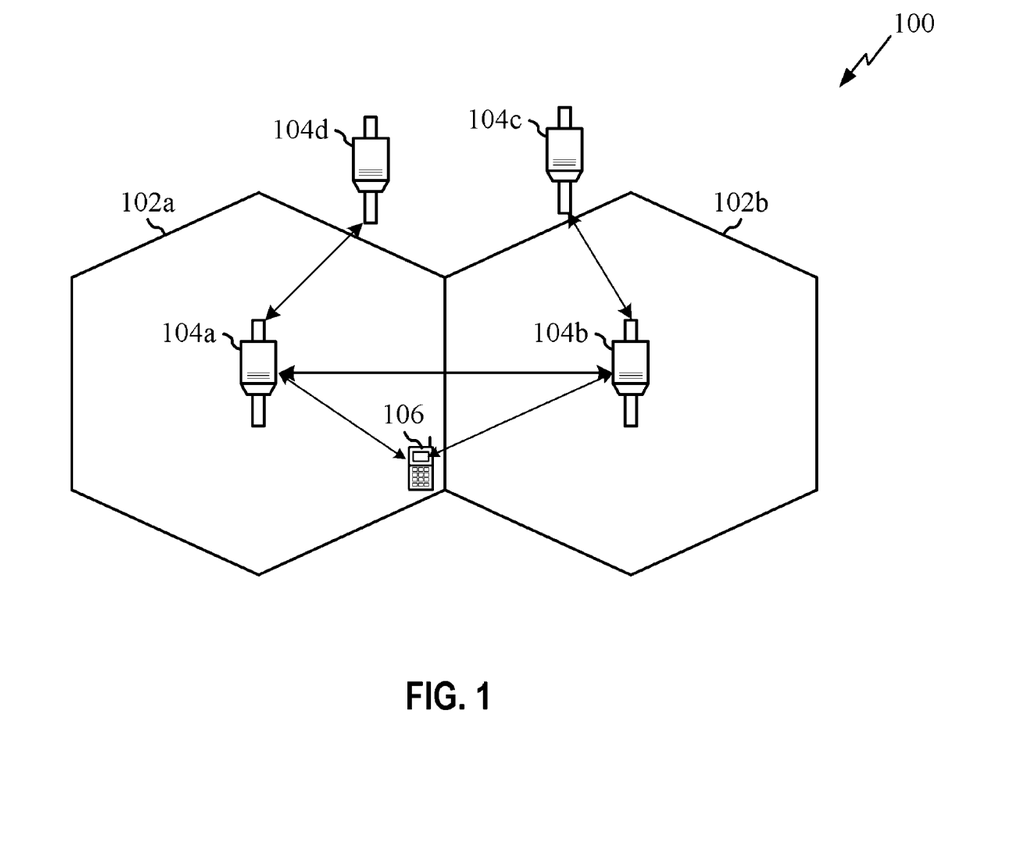
FIG. 1 illustrates an example of a wireless communication system in which aspects of the present disclosure may be employed.

FIG. 1 illustrates an example of a wireless communication network or system 100 in which aspects of the present disclosure may be employed. The wireless communication system 100 may include access points (AP) 104a, 104b, 104c and 104d. In some implementations, the AP 104a and the AP 104b may communicate with one another directly. In some other implementations, where the AP 104a and the AP 104b are located sufficiently far from one another or where other forms of interference disrupt communications between the APs 104*a* and 104*b*, the APs 104*a* and 104*b* may not communication with one another directly and instead may communicate with one another through a STA 106, for example, which may operate as a relay between the AP 104*a* and the AP 104*b*. Furthermore, in some implementations, the AP 104*d* may function as a global time resource, sometimes called an Anchor, for either of the APs 104*a* and 104*b*, for example. Likewise, in some implementations, the AP 104*c* may function as a global time resource, or Anchor, for either of the APs 104*a* and 104*b*, for example.

An access point (AP) may comprise, be implemented as, or known as a Node B, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station STA may comprise, be implemented as, or known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

A variety of processes and methods may be used for transmissions in the wireless communication system 100 between the APs 104*a*-104*d* and the STA 106. A communication link that facilitates transmission from the APs 104*a*-104*b* to the STA 106 may be referred to as a downlink (DL), and a communication link that facilitates transmission from the STA 106 to one or both of the APs 104*a*-104*b* may be referred to as an uplink (UL). Alternatively, a downlink may be referred to as a forward link or a forward channel, and an uplink may be referred to as a reverse link or a reverse channel.

The APs 104*a*-104*b* may be configured as base stations and provide wireless communication coverage in basic service areas (BSAs) 102*a* and 102*b*, respectively. Depending on the technology considered, BSA can sometimes be called coverage area, cell, etc. The APs 104*a*-104*b* along with the STA 106 may be referred to as a basic service set (BSS). As shown in FIG. 1, multiple APs may provide different BSAs to the same device. For example, STA 106 may receive service from both AP 104*a* and AP 104*b*.

The present application contemplates a simple and robust AP-to-AP synchronization protocol utilizing a global time reference which is synchronized between access points. Such AP-to-AP coordination would enable improved throughput and efficiency in the associated wireless networks. For example, utilizing a global time reference between access points would allow coordination of uplink and downlink transmissions, as well as coordination of channel use to ensure minimizing interference for wireless nodes located at the edges between basic service areas. Thus, the present application teaches the synchronization of a global time reference between access points over the air without requiring an external time source. In some implementations, synchronization of the global time reference between access points may occur within a short time, e.g., a matter of seconds or less.

Figure 2:
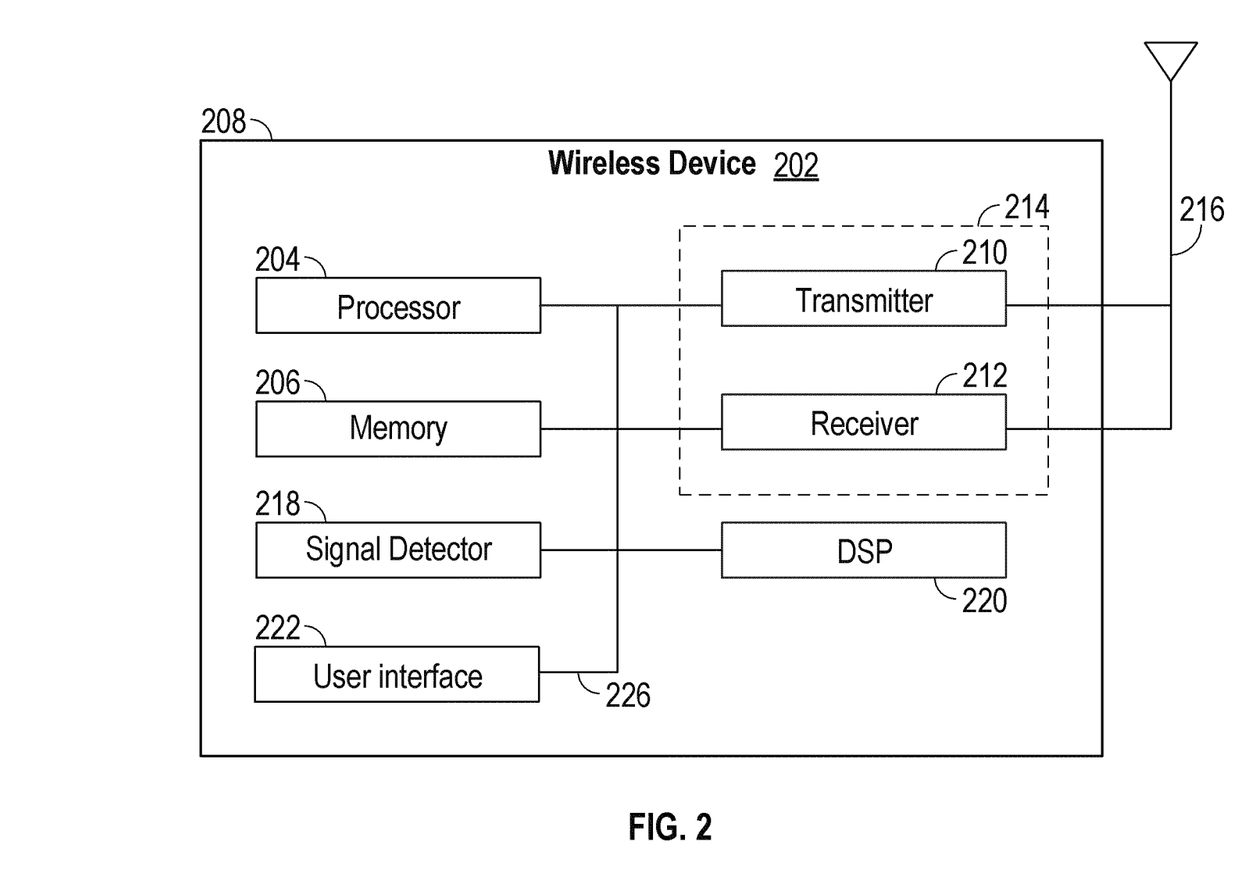
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during MIMO communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
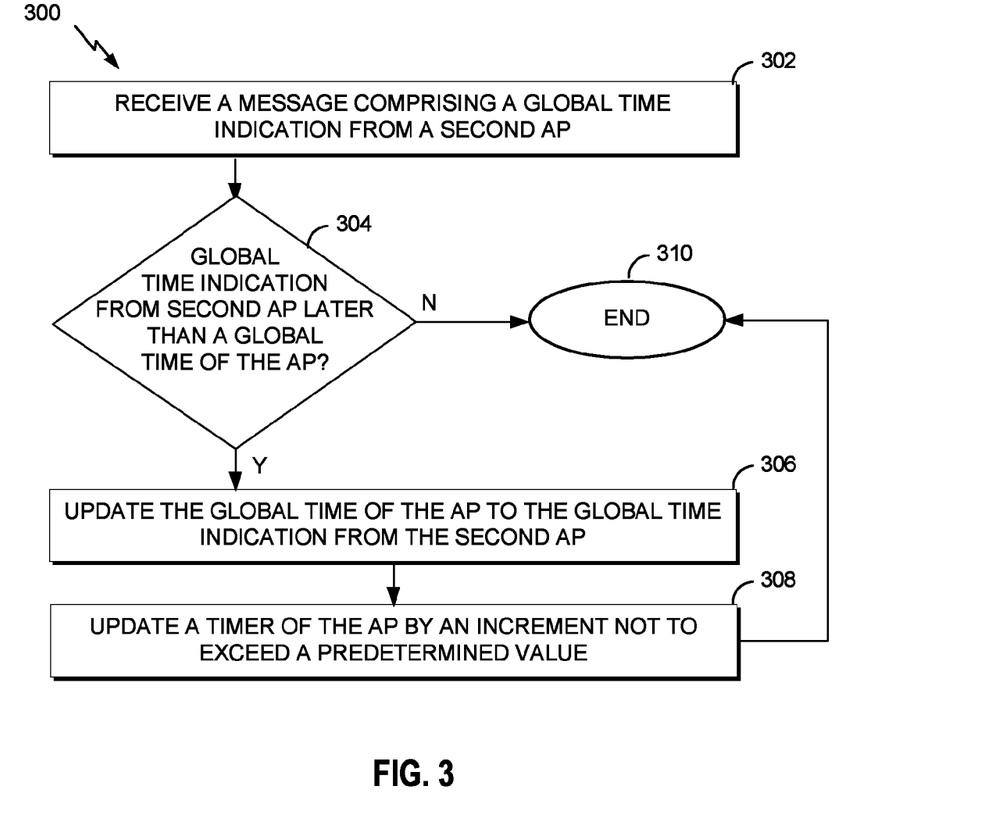
FIG. 3 is a flow chart of an aspect of an exemplary method for synchronizing a global time of an access point, according to one implementation.

FIG. 3 is a flow chart of an aspect of an exemplary method for synchronizing a global time of an access point, according to one implementation. Although the method shown by flowchart 300 will be described such that a primary AP is the AP 104a and the second AP is the AP 104b, one of ordinary skill in the art would understand that the method may be equally applied in reverse. In addition, the wireless device 202 shown in FIG. 2 may represent a more detailed view of either of the APs 104a and 104b, as described above. Thus, in one implementation, one or more of the steps in flowchart 300 may be performed by, or in connection with, a processor, receiver and/or transmitter, such as the processor 204, receiver 212, and/or transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

According to a first method, each AP may include an information element in its beacon that includes a field indicating the offset of the timing synchronization function (TSF) with respect to a global time, in addition to a field indicating the actual TSF value. Operation block 302 may include an AP, for example the AP 104a, receiving a message comprising a global time indication from a second access point (AP), for example the AP 104b. In some implementations, this global time indication may comprise the offset of the TSF with respect to the global time. For example, the AP 104a may be configured to determine or calculate the global time based on the TSF value and the offset of the TSF from the global time. Thus, because the offset of the TSF is with respect to the global time, the offset of the TSF may comprise the global time indication.

In operation block 304, the AP 104a may compare the received global time indication from the second AP (e.g., the AP 104b) with a stored value of its own global time. If the global time indication from the second AP (e.g., the AP 104b) indicates a later time than the stored value of the global time of the AP 104a, the method may move to operation block 306.

In operation block 306, the AP 104a may update the stored value for its global time to the global time indication from the second AP (AP 104b). The method may then move to operation block 308. However, if the global time indication from the second AP (AP 104b) does not indicate a later time than the stored value of the global time of the AP 104a, the AP 104a may not update its stored value for the global time and the method may move to end block 310. Thus, in this implementation, the AP 104a may only update its global time if the global time indication it receives from another AP, for example the AP 104b, is running ahead of the global time of the AP 104a. However, in some other implementations, the AP 104a may instead update its global time if the global time indication it receives from another AP, for example the AP 104b, is running behind the global time of the AP 104a. In such implementations, the operation block 304 may include the term "earlier" in place of the term "later".

In operation block 308, the AP 104a may update a timer by an increment not to exceed a predetermined value. The timer may be the TSF of the AP 104a. This operation may occur periodically (e.g., and successively), for example every TBTT, until the TSF of the AP 104a has reached a desired or assigned static offset from the global time. The desired or assigned static offset may be based on the MAC address of the AP 104a for example. The method may then continue to end block 310. For example, the AP 104a may update the TSF each TBTT by an increment selected to be small enough to ensure a maintenance of synchronization between the AP 104a and any STAs with which it is associated. The TSF acts as a timer that determines when to transmit beacons. Thus, stations associated with a particular AP utilize the known value of the TSF to wake up slightly before a beacon is expected. For this reason, radically changing the value of the TSF (as may have been done with the global time in operation block 306) may cause the associated STAs to miss beacons and start searching for the network again, which is undesirable. Thus, it is desirable that any modification to the TSF be performed in small increments for each cycle of the TSF to ensure that listening STAs do not miss a transmitted beacon from the AP. Maintenance of synchronization with associated STAs may be achieved by incrementing the TSF by an amount not to exceed a maximum permitted TSF shift (K) for each target beacon transmission time (TBTT), according to the following equation:

$$C(n)=\max(-K,\min(K,[T_{offset}-(g(n)-t(n))])) \quad \text{Eq. 1}$$

where K=maximum permitted TSF shift per TBTT;
g(n)=a remainder of the global time during an iteration divided by 100 time units;
t(n)=a remainder of the TSF during an iteration divided by 100 time units;
$T_{offset}$=the required (and eventual desired) static offset between global time and the APs TSF (which may be based on the MAC address of the AP). The TSF value may then be updated according to the following equation:

$$TSF(n)=TSF(n)+C(n) \quad \text{Eq. 2}$$

Thus, according to the above equation, the amount the TSF may be adjusted per TBTT, or per iteration, will be limited to the lesser of the total required TSF adjustment and the maximum permitted TSF shift per TBTT. Thus, for comparatively large changes to the global time during synchronization, the actual TSF offset from the newly synchronized global time will decrease (or increase depending on whether the global time was re-synchronized to a value greater than or less than its previous value) by K time units each TBTT until the desired $T_{offset}$ between the global time and the APs TSF is reached. In this way, the global time of the APs may be synchronized to the most reliable and accurate value while avoiding a loss of synchronization with associated STAs, thus maintaining a robust wireless network.

Figure 4:
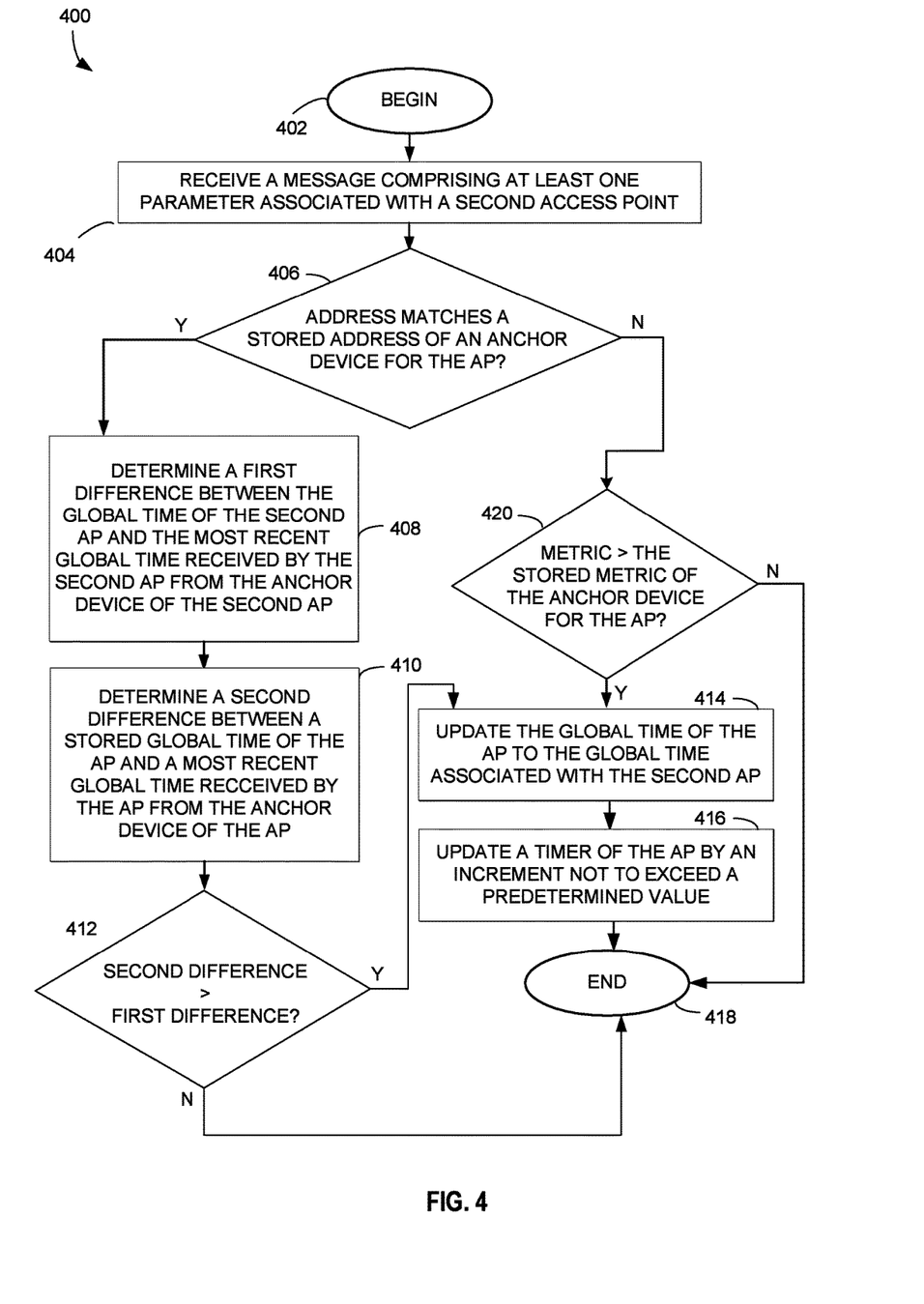
FIG. 4 is a flow chart of an aspect of an exemplary method for synchronizing a global time of an access point, according to another implementation.

FIG. 4 is a flow chart of an aspect of an exemplary method for synchronizing a global time of an access point, according to another implementation. Although the method shown by flowchart 400 will be described such that a primary AP is the AP 104a and the second AP is the AP 104b, one of ordinary skill in the art would understand that the method may be equally applied in reverse. In addition, the wireless device 202 shown in FIG. 2 may represent a more detailed view of either of the APs 104a and 104b, as described above. Thus, in one implementation, one or more of the steps in flowchart 400 may be performed by, or in connection with, a processor and/or transmitter, such as the processor 204 and transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

In some implementations, each AP, for example, the APs 104a and 104b, may store at least the following parameters in a memory or register, for example: its own potential anchor metric (PAM), an Anchor weight (PAM of the Anchor), the MAC address of the Anchor, and the last known global time (GT) of the Anchor. The AP's own PAM may be an indication of a reliability of that AP's own global time. For example, if a particular AP has a particularly accurate clock, or if the AP has a connection to the internet where it may have access to a particularly accurate clock, that AP may have an increased PAM. The Anchor weight is the PAM of the AP currently being utilized by a particular AP as its Anchor. Where an AP has not yet associated with a network and does not have an indication of global time yet, the stored Anchor weight may be set to some predetermined value, such as zero. The Anchor MAC address is merely the MAC address of the AP\currently being utilized by a particular AP as its Anchor. The last known GT of the Anchor is the global time indication that was most recently received from the Anchor and utilized to calibrate GT by the particular AP. In such implementations, beacons transmitted by each AP may include the following: 1) an offset of the AP's TSF from the AP's global time, 2) an Anchor metric, i.e., Anchor weight, associated with the Anchor that the AP has most recently utilized to update its global time, 3) the MAC address of the Anchor, and 4) the last known global time received from the Anchor.

The method described by flowchart 400 may begin with begin block 402. The flowchart 400 may continue to operation block 404, which may include receiving (by the AP 104a) a message (from a second AP e.g., the AP 104b) comprising at least one parameter associated with a second access point. The at least one parameter may include an address of an anchor device for the second AP (e.g., the MAC address of the AP 104c), a metric associated with the anchor device (e.g., the anchor metric or anchor weight of the AP 104c), an indication of a global time associated with the second AP (e.g., the AP 104b), and a most recent global time received by the second AP (e.g., the AP 104b) from the anchor device (e.g., the AP 104c).

The method may continue to operation block 406, where the AP 104a may compare the received MAC address of the Anchor device for the AP 104b (e.g., the MAC address of the AP 104c) to a stored MAC address of its own anchor device (e.g., the AP 104a has stored the MAC address of the Anchor from which it most recently updated its global time indication). If the received MAC address of the Anchor device for the AP 104b matches the stored address of the Anchor device for the AP 104a, the AP 104a may determine that the AP 104b is utilizing the same Anchor (e.g., a common anchor device) for global timing synchronization. In operation block 406, the AP 104a may also, optionally, compare the received metric with a stored metric of its own Anchor device. This may be a redundant comparison because if the MAC address of the AP 104b is utilizing the same Anchor as the AP 104a, the Anchor metrics would also match. In such a case, the method may continue to operation block 408.

Operation block 408 may include determining a first length of time since a global time of the second access point (e.g., the AP 104b) was most recently updated. The method may determine the first length of time by determining a first difference between the global time associated with the second AP (e.g., the AP 104b) and the most recent global time received by the second AP from the Anchor device (e.g., the AP 104c). The method may continue to operation block 410.

Operation block 410 may include determining a second length of time since the global time of the access point (e.g., the AP 104a) was most recently updated. The method may determine the second length of time by determining a second difference between the stored global time associated with the AP (e.g., the AP 104a) and a stored most recent global time received from the anchor device for the AP. The method may continue to operation block 412.

At operation block 412 the AP 104a may compare the second length to the first length. In other words, the AP 104a may compare the length of time since the AP 104b updated its global time with the length of time since it (the AP 104a) has updated its own global time. If the length of time since the AP 104a last updated its global time is longer than the length of time since the AP 104b last updated its global time, then the global time of the AP 104b has been updated (using a global time reference from the same Anchor) more recently than has the global time of AP 104a. Accordingly, the AP 104a can assume that the global time associated with the AP 104b is more accurate than the current global time stored by the AP 104a because it was more recently updated. In such a case, the method may continue to operation block 414. However, if the second difference is not greater than the first difference, the AP 104a can assume that its stored global time is more accurate than that of the AP 104b and the AP 104a will not update its global time and proceeds to end block 418.

At operation block 414, the AP 104a may update its global time to the global time associated with the second AP (e.g., the AP 104b). The AP 104a may also update its "last known global time for the anchor" to match the one received from AP 104b. In another embodiment the AP 104a may only update its "last known global time for the anchor" if the AP 104a receives a message directly from the anchor. The method may then proceed to operation block 416.

At operation block 416, the AP 104a may update a timer of the AP by an increment not to exceed a predetermined value. The timer may be the TSF of the AP 104a. This operation may occur periodically (e.g., successively), for example every TBTT, until the TSF of the AP 104a has reached a desired or assigned static offset from the global time. The desired or assigned static offset may be based on the MAC address of the AP 104a for example. The method may then continue to end block 418. For example, the AP 104a may update the TSF each TBTT by an increment that will ensure a maintenance of synchronization between the AP 104a and any STAs with which it is associated, as previously described in connection with FIG. 3 and equations 1 and 2.

Returning to operation block 406, as previously explained, if the AP 104a and the AP 104b do not have the same (e.g., common) Anchor (e.g., where the AP 104a is currently utilizing the AP 104d as its Anchor and the AP 104b is currently utilizing the AP 104c as its Anchor), the method may continue to operation block 420.

At operation block 420, the AP 104a may compare the Anchor metric received from the second AP (e.g., the Anchor metric or weight of the AP 104c received from the AP 104b) with the stored metric/weight of its own Anchor device (e.g., the Anchor metric of the AP 104d). If the received metric of the second AP's Anchor device is greater than the stored metric for the Anchor device of the AP 104a, then the AP 104a may determine that the Anchor device for the AP 104b is the most reliable device to serve as its Anchor. In such a case, the method may continue to operation block 414, where the AP 104a may update its global time to the global time associated with the second AP (e.g., the AP 104b). In this case, because the AP 104a has changed its Anchor, the AP 104a may additionally update its Anchor weight, Anchor MAC address and last known global time of Anchor values to the corresponding values received in the message from the second AP (e.g., the AP 104b). The method may then proceed to operation block 416 and then end block 418 as described above.

If the received Anchor metric is not greater than the stored Anchor metric for the Anchor device of the AP 104a, then the AP 104a may determine that its current Anchor is more reliable than the Anchor for the AP 104b and will not update its global time. In such a case, the method may continue to end block 418. Thus, by the method disclosed in FIG. 4, because each AP includes the above-mentioned information in each beacon, all APs will eventually synchronize their global time with the same Anchor, having the highest Anchor metric/weight, thereby also synchronizing their global time to that of the most reliable Anchor.

As previously stated, the APs may synchronize global time with one another based on the above-mentioned information received from other APs. Such information may be communicated through one of two modes for messaging. In the first mode, the APs may listen in on beacons transmitted directly from the APs that are in range. In the both modes, the beacons transmitted by each AP may include: 1) an offset of the AP's TSF from the AP's global time, 2) an Anchor metric, i.e., Anchor weight, associated with the Anchor that the AP has most recently utilized to update its global time, 3) the MAC address of the Anchor, and 4) the last known global time received from the Anchor.

However, because the most accurate AP for synchronizing global time may not be guaranteed to be located within range of all APs, it is desirable that the APs not be limited to synchronizing with only APs within direct communication range. Thus, in the second mode, the APs may utilize STAs as relays to obtain beacon information of out-of-range APs. In such implementations, the APs and STAs may utilize Neighbor report request and response frames to relay the beacon information from one AP to another via at least one STA.

Figure 5:
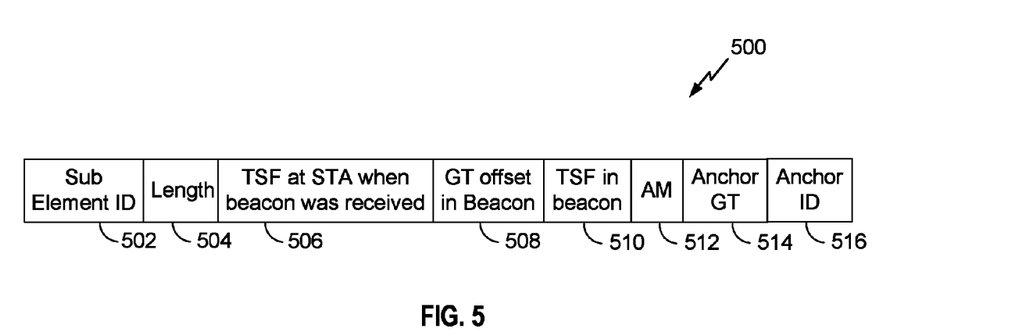
FIG. 5 illustrates an example of an information element frame for synchronizing a global time reference for access points, according to one implementation.

FIG. 5 illustrates an example of an information element frame for synchronizing a global time reference for access points, according to one implementation. For example, FIG. 5 may show a neighborhood report information element (IE) 500 which may be utilized to relay information received by an STA from an OBSS AP to its associated AP. For example, where the AP 104a and 104b of FIG. 1 are out of range from one another, the STA 106a may receive a beacon from the AP 104b including the above-mentioned information, and relay that information to the AP 104a utilizing the IE 500. The IE 500 may comprise the following fields: a Sub Element ID field 502, a length field 504, a field 506 indicating the TSF at the STA when the beacon was received, a field 508 indicating the offset of the AP's TSF from the AP's global time, a field 510 indicating the AP's TSF received in the beacon, a field 512 indicating the Anchor metric (i.e., the Anchor weight) of the Anchor being utilized by the AP transmitting the beacon, a field 514 indicating the last known global time of the Anchor, and a field 516 indicating the MAC address of the Anchor. Note that if nodes are not using the Anchor method to synchronize, then fields 512, 514 and 516 may not needed. Similarly the beacons themselves may not have any information relating to an anchor.

In operation, the STA 106a may receive a beacon from the AP 104b including an offset of the AP's TSF from the AP's global time, an Anchor metric, i.e., Anchor weight, associated with the Anchor that the AP has most recently utilized to update its global time, the MAC address of the Anchor, and the last known global time received from the Anchor. The STA 106a may note its TSF when the beacon was received and populate the value into the field 506. Additionally, the STA may include its TSF counter when the information element gets sent. This information may allow the receiving AP, i.e., the AP 104a, to additionally account for any delay between the STA 106a receiving the beacon from the AP 104b and the STA 106a transmitting the IE 500 to the AP 104a. The STA 106a may additionally use the received offset of the AP's TSF from the AP's global time and populate the value into the field 508. Likewise, the STA 106a may use the received TSF value of the AP and populate the value into the field 510. The STA 106a may use the received Anchor metric, global time and MAC ID associated with the Anchor that the transmitting AP has most recently utilized to update its global time and populate the values into the fields 512, 514 and 516, respectively. The STA 106a may then transmit the IE 500 to the AP 104a and the AP 104a may use the information as described above to synchronize its global time.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method for synchronizing a global time of an access point, comprising:
   receiving a message comprising a global time indication from a second access point, and
   updating the global time of the access point to the global time indication from the second access point by updating a timer of the access point by an increment not to exceed a predetermined value selected small enough to ensure a maintenance of synchronization between the access point and at least one associated wireless station, wherein when an anchor device is a common anchor device for the access point and the second access point, wherein updating the global time of the access point to the global time of the second access point is when a second difference is larger than a first difference, and wherein the global time of the access point is maintained if the second difference is smaller than the first difference, the first difference being between the global time indication of the second access point and a most recent global time received by the second access point from the anchor device, the second difference being between a stored global time of the access point and the most recent global time received by the access point from the anchor device.

2. The method of claim 1, wherein the global time of the access point is updated to the global time indication from the second access point when the global time indication from the second access point indicates a later global time than the global time of the access point.

3. The method of claim 1, wherein the global time of the access point is updated to the global time indication from the second access point when the global time indication from the second access point indicates an earlier global time than the global time of the access point.

4. The method of claim 1, wherein the global time indication is an indication of an offset of a timing synchronization function of the second access point from the global time of the second access point.

5. The method of claim 1, wherein the message comprises a beacon frame.

6. The method of claim 1, further comprising successively updating the timer by the increment until the timer is updated to correspond to the global time indication from the second access point.

7. The method of claim 6, wherein successively updating the timer of the access point is performed periodically.

8. The method of claim 1, wherein the method further comprises determining whether an anchor device is a common anchor device for the access point and the second access point by comparing a media access control (MAC) address of the anchor device with a stored anchor device MAC address.

9. The method of claim 8, wherein the method further comprises updating the global time of the access point to the global time of the second access point when the anchor device is not a common anchor device for the access point and the second access point and an anchor weight of the anchor device is greater than a stored anchor weight.

10. The method of claim 1, wherein the message is received from a wireless station that forwards the message from the second access point, and wherein the message further comprises one or more of:
 a field indicating a timing synchronization function of the wireless station when the message was received by the wireless station;
 a field indicating an offset of the timing synchronization function from the global time indication from the second access point;
 a field indicating a timing synchronization function of the second access point received by the wireless station in the message;
 a field indicating a reliability of an anchor device utilized by the second access point to determine the global time indication;
 a field indicating a last known global time of the anchor device; and
 a field indicating a medium access control (MAC) address of the anchor device.

11. An apparatus for synchronizing a global time of the apparatus, comprising:
 a receiver configured to receive a message comprising a global time indication from a second access point; and
 a processor configured to update the global time of the apparatus to the global time indication from the second access point by updating a timer of the apparatus by an increment not to exceed a predetermined value selected small enough to ensure a maintenance of synchronization between the apparatus and at least one associated wireless station, wherein when an anchor device is a common anchor device for the apparatus and the second access point, wherein the processor is further configured to update the global time of the apparatus to the global time of the second access point when a second difference is larger than a first difference, and wherein the global time of the apparatus is maintained if the second difference is smaller than the first difference, the first difference being between the global time indication of the second access point and a most recent global time received by the second access point from the anchor device, the second difference being between a stored global time of the apparatus and the most recent global time received by the apparatus from the anchor device.

12. The apparatus of claim 11, wherein the processor is configured to update the global time of the apparatus to the global time indication from the second access point when the global time indication from the second access point indicates a later global time than the global time of the apparatus.

13. The apparatus of claim 11, wherein the processor is configured to update the global time of the apparatus to the global time indication from the second access point when the global time indication from the second access point indicates an earlier global time than the global time of the apparatus.

14. The apparatus of claim 11, the global time indication comprising an indication of an offset of a timing synchronization function of the second access point from the global time of the second access point.

15. The apparatus of claim 11, wherein the message comprises a beacon frame.

16. The apparatus of claim 11, the processor being further configured to successively update the timer by an increment until the timer is updated to correspond to the global time indication from the second access point.

17. The apparatus of claim 16, wherein the processor is configured to successively update the timer periodically.

18. The apparatus of claim 11, wherein the processor is further configured to determine whether an anchor device is a common anchor device for the apparatus and the second access point by comparing a media access control (MAC) address of the anchor device with a stored anchor device MAC address.

19. The apparatus of claim 18, wherein the processor is further configured to update the global time of the apparatus to the global time of the second access point when the anchor device is not a common anchor device for the apparatus and the second access point and an anchor weight of the anchor device is greater than a stored anchor weight.

20. The apparatus of claim 11, wherein the receiver is configured to receive the message from a wireless station that forwards the message from the second access point, and wherein the message further comprises one or more of:
 a field indicating a timing synchronization function of the wireless station when the message was received by the wireless station;
 a field indicating an offset of the timing synchronization function from the global time indication from the second access point;
 a field indicating a timing synchronization function of the second access point received by the wireless station in the message;
 a field indicating a reliability of an anchor device utilized by the second access point to determine global time indication from the second access point;
 a field indicating a last known global time of the anchor device; and
 a field indicating a medium access control (MAC) address of the anchor device.

21. A non-transitory computer-readable medium comprising code that, when executed, causes an apparatus to:
 receive a message comprising a global time indication from a second access point, and
 update the global time of the apparatus to the global time indication from the second access point by updating a timer of the apparatus by an increment not to exceed a predetermined value selected small enough to ensure a maintenance of synchronization between the apparatus and at least one associated wireless station, wherein when an anchor device is a common anchor device for the apparatus and the second access point, wherein updating the global time of the apparatus to the global time of the second access point is when a second difference is larger than a first difference, and wherein the global time of the apparatus is maintained if the second difference is smaller than the first difference, the first difference being between the global time indication of the second access point and a most recent global time received by the second access point from the anchor device, the second difference being between a stored global time of the apparatus and the most recent global time received by the apparatus from the anchor device.

22. An apparatus for synchronizing a global time of the apparatus, comprising:
   means for receiving a message comprising a global time indication from a second access point; and
   means for updating the global time of the apparatus to the global time indication from the second access point by updating a timer of the apparatus by an increment not to exceed a predetermined value selected small enough to ensure a maintenance of synchronization between the apparatus and at least one associated wireless station, wherein when an anchor device is a common anchor device for the apparatus and the second access point, wherein the means for updating is further configured to update the global time of the apparatus to the global time of the second access point when a second difference is larger than a first difference, and wherein the global time of the apparatus is maintained if the second difference is smaller than the first difference, the first difference being between the global time indication of the second access point and a most recent global time received by the second access point from the anchor device, the second difference being between a stored global time of the apparatus and the most recent global time received by the apparatus from the anchor device.

* * * * *